US012807039B2

(12) United States Patent
Hibino et al.

(10) Patent No.: US 12,807,039 B2
(45) Date of Patent: Nov. 24, 2026

(54) VEHICLE REAR STRUCTURE

(71) Applicant: TOYOTA JIDOSHA KABUSHIKI KAISHA, Toyota (JP)

(72) Inventors: Haruhiko Hibino, Toyota (JP); Hiroyuki Tada, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 19/034,724

(22) Filed: Jan. 23, 2025

(65) Prior Publication Data

US 2025/0262988 A1 Aug. 21, 2025

(30) Foreign Application Priority Data

Feb. 21, 2024 (JP) ................................ 2024-024431

(51) Int. Cl.
*B60N 2/015* (2006.01)
*B62D 25/20* (2006.01)

(52) U.S. Cl.
CPC .......... *B60N 2/015* (2013.01); *B62D 25/2027* (2013.01)

(58) Field of Classification Search
CPC ............................ B62D 25/2027; B60N 2/015
See application file for complete search history.

(56) References Cited

U.S. PATENT DOCUMENTS 5,649,783 A * 7/1997 Ichikawa ............... B60N 2/015 24/297
5,890,831 A * 4/1999 Kato ...................... B60N 2/015 403/329

FOREIGN PATENT DOCUMENTS

DE 102014204082 B4 * 8/2019
JP 2007-296903 A 11/2007

* cited by examiner

*Primary Examiner* — Lori Lyjak
(74) *Attorney, Agent, or Firm* — Sughrue Mion, PLLC

(57) ABSTRACT

The vehicle rear structure includes a rear seat cushion, a wire assembly, a clip, and a closed cross-section portion disposed at a front portion of the rear floor panel. The rear seat cushion is attached to the rear floor panel by inserting a downward protruding portion into the clip. The clip is attached to the closed cross-section portion and has a distal end extending into the closed cross-section portion. The closed cross-section portion includes an abutment surface with which a side surface of the distal end portion of the clip contacts.

3 Claims, 6 Drawing Sheets

SECTION A- A

DETAILED PERSPECTIVE VIEW OF PORTION B

VEHICLE REAR STRUCTURE

CROSS REFERENCE TO RELATED APPLICATION

This application claims priority to Japanese Patent Application No. 2024-24431 filed on Feb. 21 2024, which is incorporated herein by reference in its entirety including the specification, claims, drawings, and abstract.

TECHNICAL FIELD

The present disclosure relates to a vehicle rear structure including a rear seat cushion and a rear floor panel.

BACKGROUND

JPA 2007-296903 discloses a structure of a rear seat for a vehicle. JPA 2007-296903 discloses a structure in which a part of a wire assembly disposed inside a rear seat cushion is formed as a lower protruding portion protruding downward from a lower surface of the rear seat cushion, and the rear seat cushion is attached to a rear floor panel by inserting the lower protruding portion into a resin clip attached to the rear floor panel.

SUMMARY

When the vehicle collides forward, the rear seat cushion moves toward the front of the vehicle while rotating so that the rear portion is lifted. For this reason, a rotation moment that attempts to rotate with respect to the rear floor panel is applied to the resin clip (see FIG. 6). In the structure of the rear seat described in JPA 2007-296903, the resin clip may be detached from the rear floor panel due to the rotation moment, and the rear seat cushion may be detached from the rear floor panel.

Accordingly, an object of the present disclosure is to prevent a rear seat cushion from being detached from a rear floor panel at the time of a front collision.

In accordance to an aspect of the present disclosure, a rear seat cushion; a wire assembly disposed inside the rear seat cushion and having a downward protruding portion protruding downward from a lower surface of the rear seat cushion at a front portion of the rear seat cushion; a clip attached to a rear floor panel to hold the downward protruding portion; and a closed cross-sectional portion of a rectangular cross section disposed at the front of the rear floor panel and extending in a vehicle width direction. The rear seat cushion is attached to the rear floor panel by inserting the downward protruding portion into the clip. The clip has a head portion attached to an upper plate constituting a part of the closed cross-sectional portion and a tip portion extending into the closed cross-sectional portion. The closed cross-sectional portion includes an abutment surface with which a side surface of the tip portion of the clip contacts. The closed cross-sectional portion includes an abutment surface with which a side surface of the tip portion of the clip contacts. The abutment surface is disposed rearward to the clip.

Accordingly, since the rotation moment applied from the rear seat cushion at the time of the front collision is received by the abutment surface, the rotation of the clip is suppressed, and the clip can be suppressed from being detached from the rear floor panel. Therefore, it is possible to prevent the rear seat cushion from being detached from the rear floor panel at the time of the front collision.

In the vehicle rear structure of the present disclosure, the abutment surface may be a surface of a bracket attached to a rear plate constituting a part of the closed cross-sectional portion.

As described above, by adding the bracket to the rear floor panel, it is possible to easily suppress the rotation of the clip, and it is possible to suppress the separation of the rear seat cushion from the rear floor panel at the time of the front collision.

In the vehicle rear structure of the present disclosure, the closed cross-sectional portion may include a rear plate provided with a protrusion protruding toward the front of the vehicle, and the abutment surface may be a front surface of the protrusion.

Accordingly, the rotation of the clip can be suppressed with a small number of parts. According to the present disclosure, it is possible to suppress detachment of the rear seat cushion from the rear floor panel at the time of a front collision.

DESCRIPTION OF EMBODIMENTS

Figure 1:
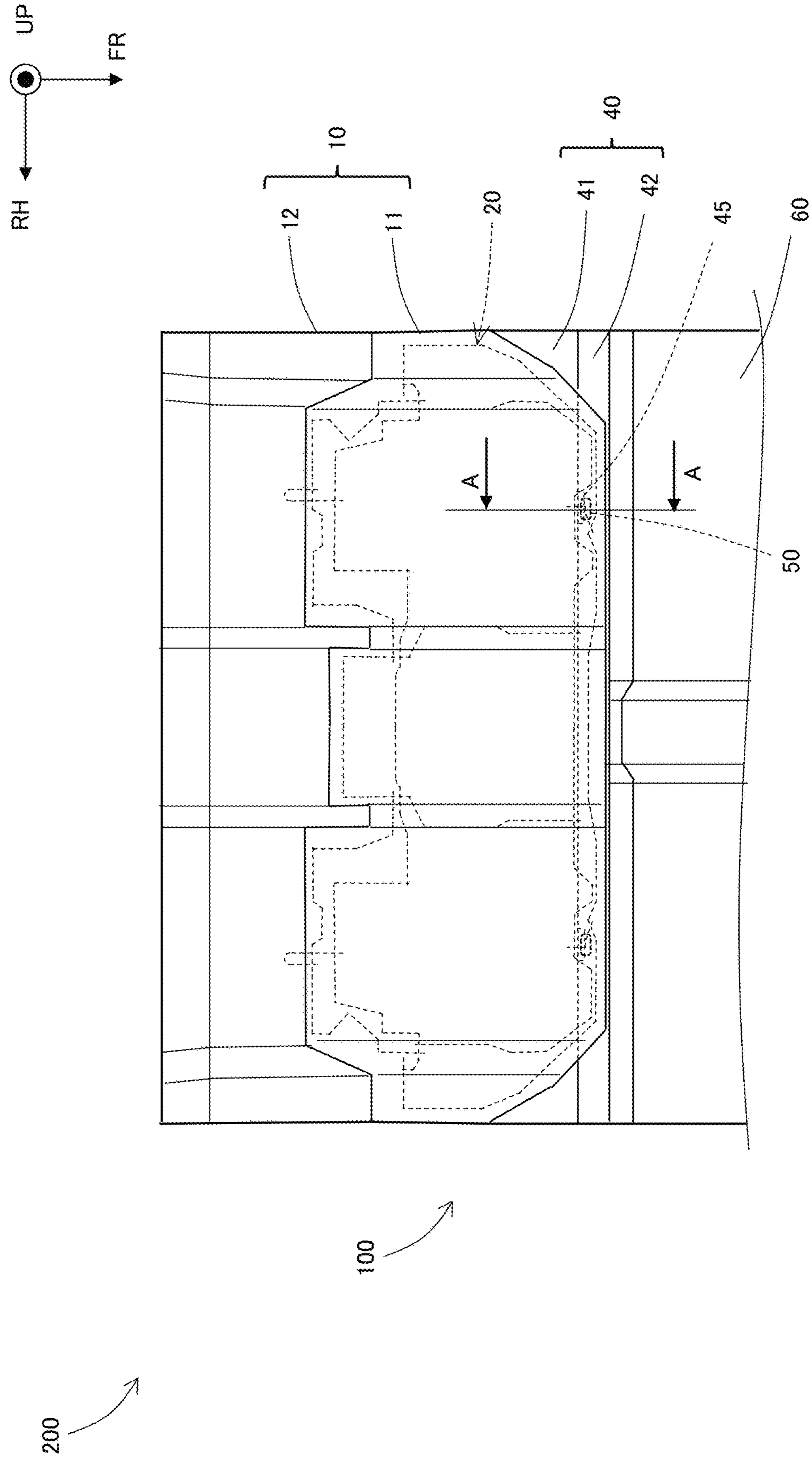
FIG. 1 is a plan view showing a vehicle cabin of a vehicle having a vehicle rear structure according to an embodiment.

Hereinafter, a vehicle rear structure 100 according to an embodiment will be described with reference to the drawings. First, a configuration of a vehicle 200 including a vehicle rear structure 100 will be described with reference to FIG. 1. Note that FR, UP, and RH shown in the drawings indicate a front side, an upper side, and a right side of the vehicle 200 including the vehicle rear structure 100, respectively. The opposite directions of FR, UP, and RH indicate the rear side, the lower side, and the left side, respectively. Hereinafter, in a case where the front-rear direction, the left-right direction, and the up-down direction are simply used, the front-rear direction, the left-right direction, and the up-down direction of the vehicle 200 are indicated unless otherwise specified.

As shown in FIG. 1, the vehicle 200 includes a floor panel 60, a rear floor panel 40, and a rear seat 10. The floor panel 60 constitutes a front portion of a floor of the vehicle cabin. A front seat (not shown) is mounted on the floor panel 60. The rear floor panel 40 constitutes a rear portion of the floor of the vehicle cabin. The rear seat 10 is mounted on the rear floor panel 40. The rear seat 10 includes a rear seat cushion 11 on which an occupant sits, and a rear seat back 12 that supports the back of the occupant.

The vehicle rear structure 100 includes a rear seat cushion 11, a wire assembly 20, a clip 50, a rear floor panel 40, and a bracket 45.

Figure 2:
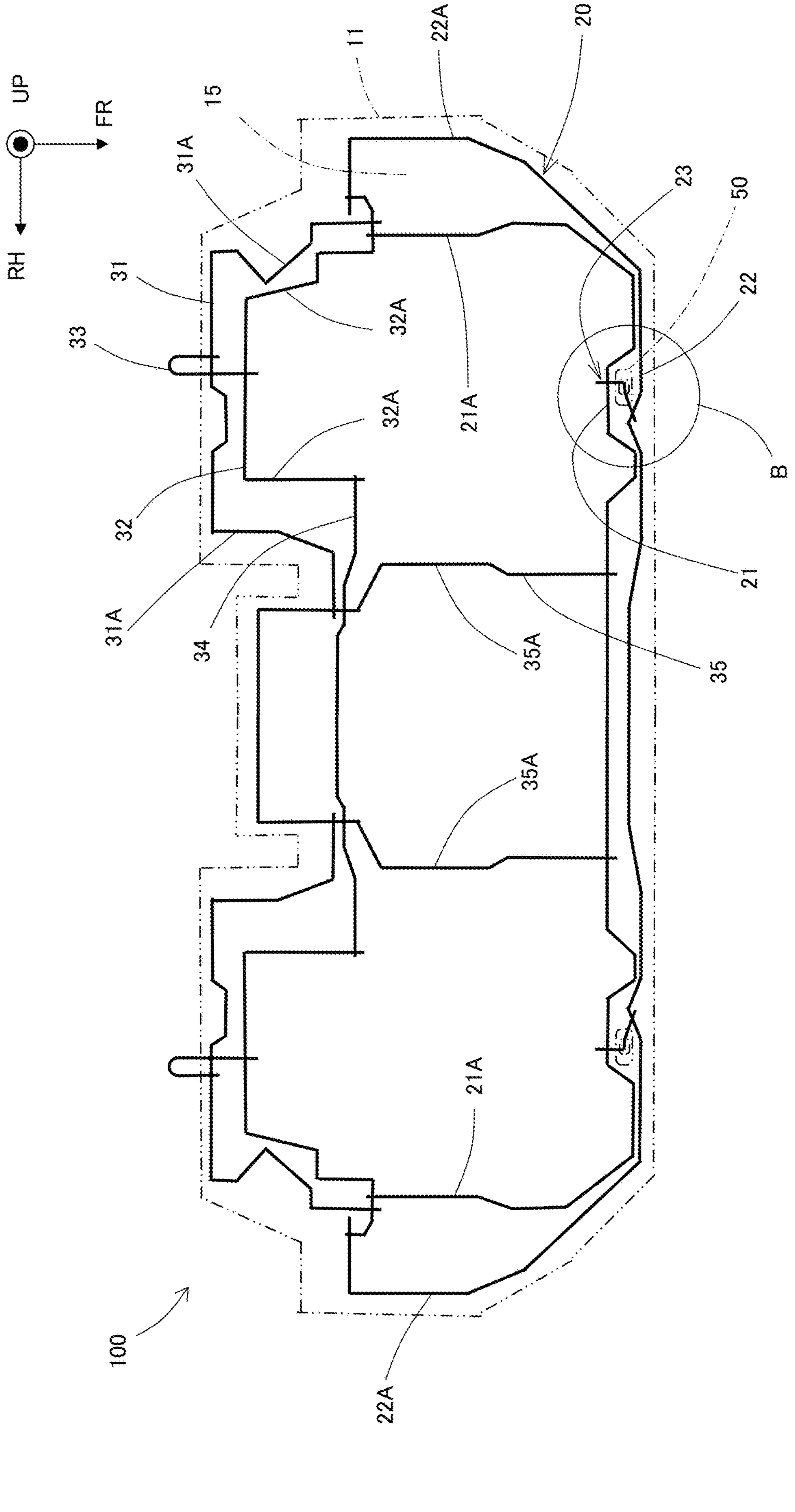
FIG. 2 is a plan view showing a wire assembly disposed inside a rear seat cushion of the vehicle rear structure of the embodiment.

As shown in FIG. 2, the rear seat cushion 11 is provided with a pad 15 made of a foamed resin and constituting a seat portion. A wire assembly 20 is disposed in the pad 15 to reinforce the seat.

The wire assembly 20 includes a front upper wire 21, a front lower wire 22, a front fixing wire 23, a rear upper wire 31, a rear lower wire 32, a rear fixing wire 33, a rear cross wire 34, and a center wire 35. The front fixing wire 23 fixes the front portion of the rear seat cushion 11 to the rear floor panel 40. The rear fixing wire 33 fixes the rear portion of the rear seat cushion 11 to the body.

The front upper wire 21 is a substantially U-shaped wire having a central portion extending in the vehicle width direction, left and right end portions curved toward the vehicle rear side, and left and right leg portions 21A extending toward the vehicle rear side. The front lower wire 22 is a substantially U-shaped wire disposed below the front upper wire 21 and having a leg portion 22A extending rearward of the vehicle. The rear upper wire 31 is a substantially U-shaped wire in which two leg portions 31A extend from the vehicle rear side toward the vehicle front side. The rear lower wire 32 is a substantially U-shaped wire disposed below the rear upper wire 31 and having two leg portions 32A extending from the rear of the vehicle toward the front of the vehicle. A rear end portion of the leg portion 21A of the front upper wire 21 and a rear end portion of the leg portion 22A of the front lower wire 22 are connected to a front end portion of the leg portion 32A of the rear lower wire 32. The left and right rear lower wires 32 are connected to each other by a rear cross wire 34. The center wire 35 is a substantially U-shaped wire having two leg portions 35A that extend in the vehicle width direction at the rear of the center of the rear seat cushion 11 and extend toward the front of the vehicle at positions slightly deviated to the left and right from the center in the vehicle width direction. A front end portion of the center wire 35 is connected to the front upper wire 21. An end portion of the rear upper wire 31 on the vehicle center side is connected to the center wire 35.

Figure 3:
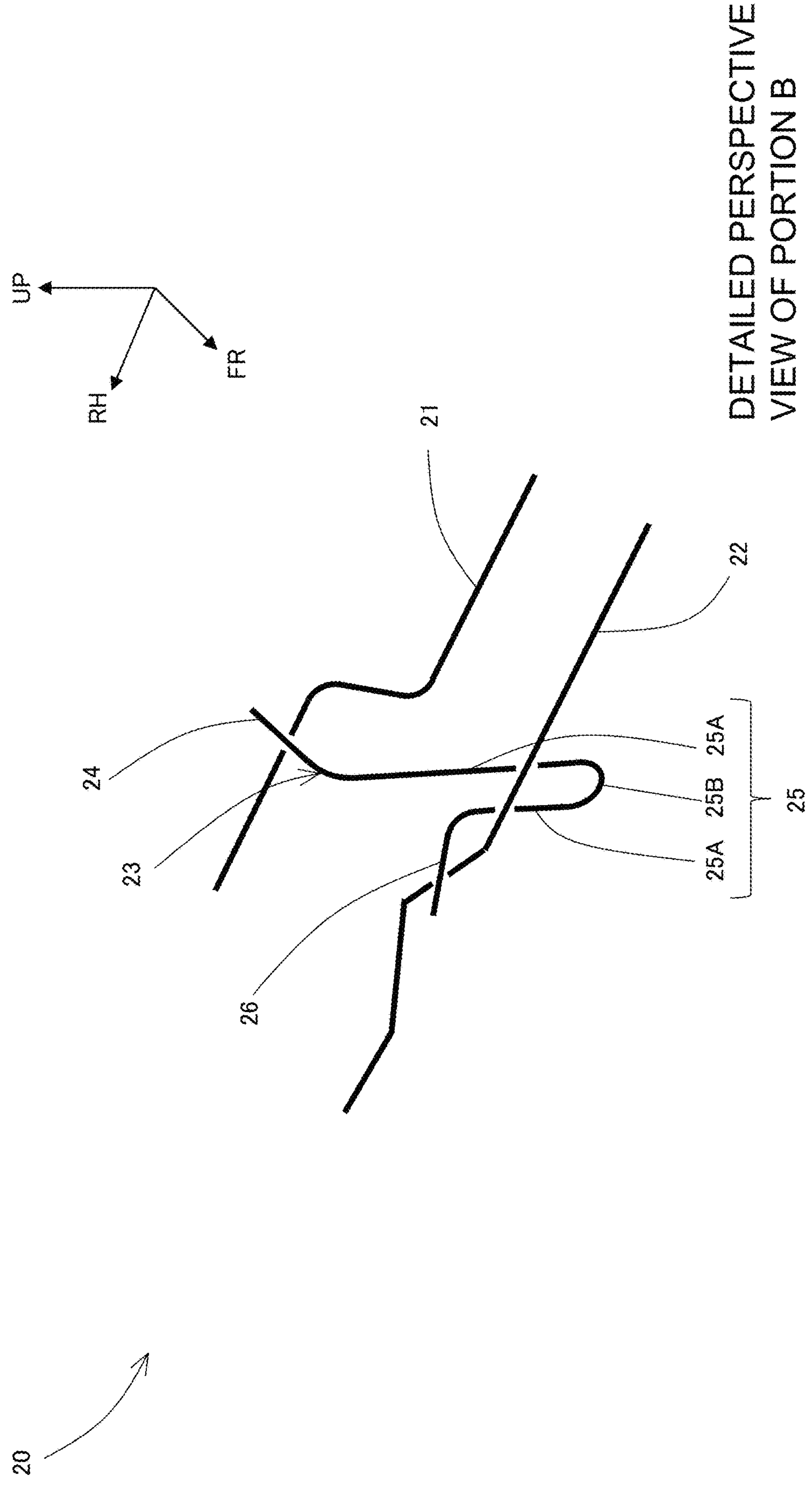
FIG. 3 is a perspective view showing a downward protruding portion of the wire assembly shown in FIG. 2, and is a detailed perspective view of a portion B shown in FIG. 2.
Figure 4:
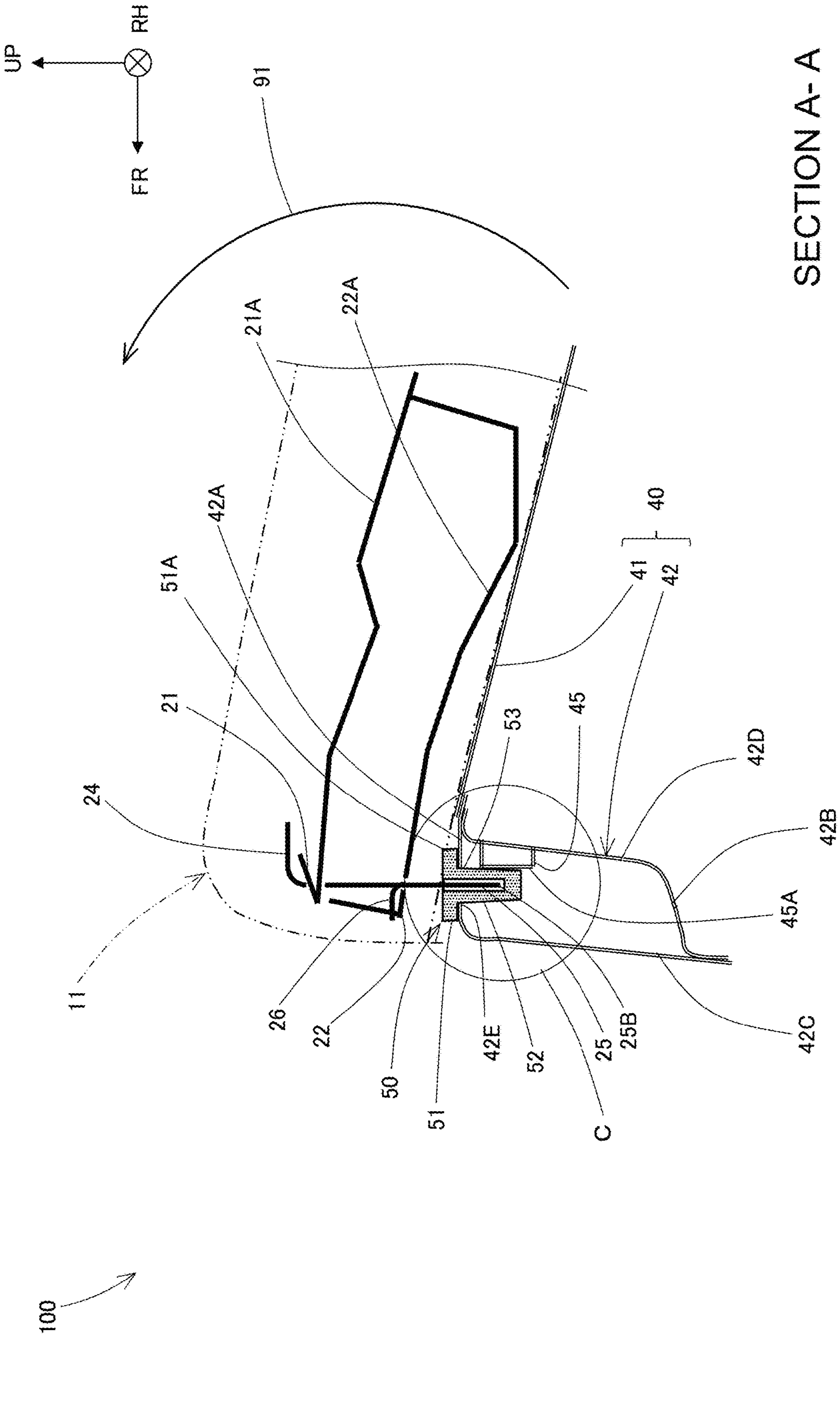
FIG. 4 is a cross-sectional view showing the vehicle rear structure of the embodiment, and is a cross-sectional view taken along line A-A of FIG. 1.

As shown in FIG. 3, the front fixing wire 23 includes an upper connecting portion 24 connected to the front upper wire 21, a lower connecting portion 26 connected to the front lower wire 22, and a U-shaped downward protruding portion 25 disposed between the upper connecting portion 24 and the lower connecting portion 26. The downward protruding portion 25 includes two leg portions 25A and a curved lower end portion 25B connecting the two leg portions 25A. As shown in FIG. 4, the downward protruding portion 25 protrudes downward from the lower surface of the rear seat cushion 11. The downward protruding portion 25 is inserted into a clip 50 attached to the rear floor panel 40 and fixed to the rear floor panel 40.

As shown in FIGS. 1 and 4, the rear floor panel 40 includes a flat plate portion 41 disposed at the rear and a closed cross-sectional portion 42 disposed at the front. The rear seat cushion 11 is placed on the upper surface of the flat plate portion 41.

The closed cross-sectional portion 42 is a rectangular closed cross-sectional portion composed of an upper plate 42A, a lower plate 42B, a front plate 42C, and a rear plate 42D. The closed cross-sectional portion 42 extends in the vehicle width direction and constitutes a frame member of the body. A lower end of the front plate 42C of the closed cross-sectional portion 42 is connected to the floor panel 60. A hole 42E is provided in the upper plate 42A of the closed cross-sectional portion 42. The clip 50 is attached to the hole 42E.

Figure 5:
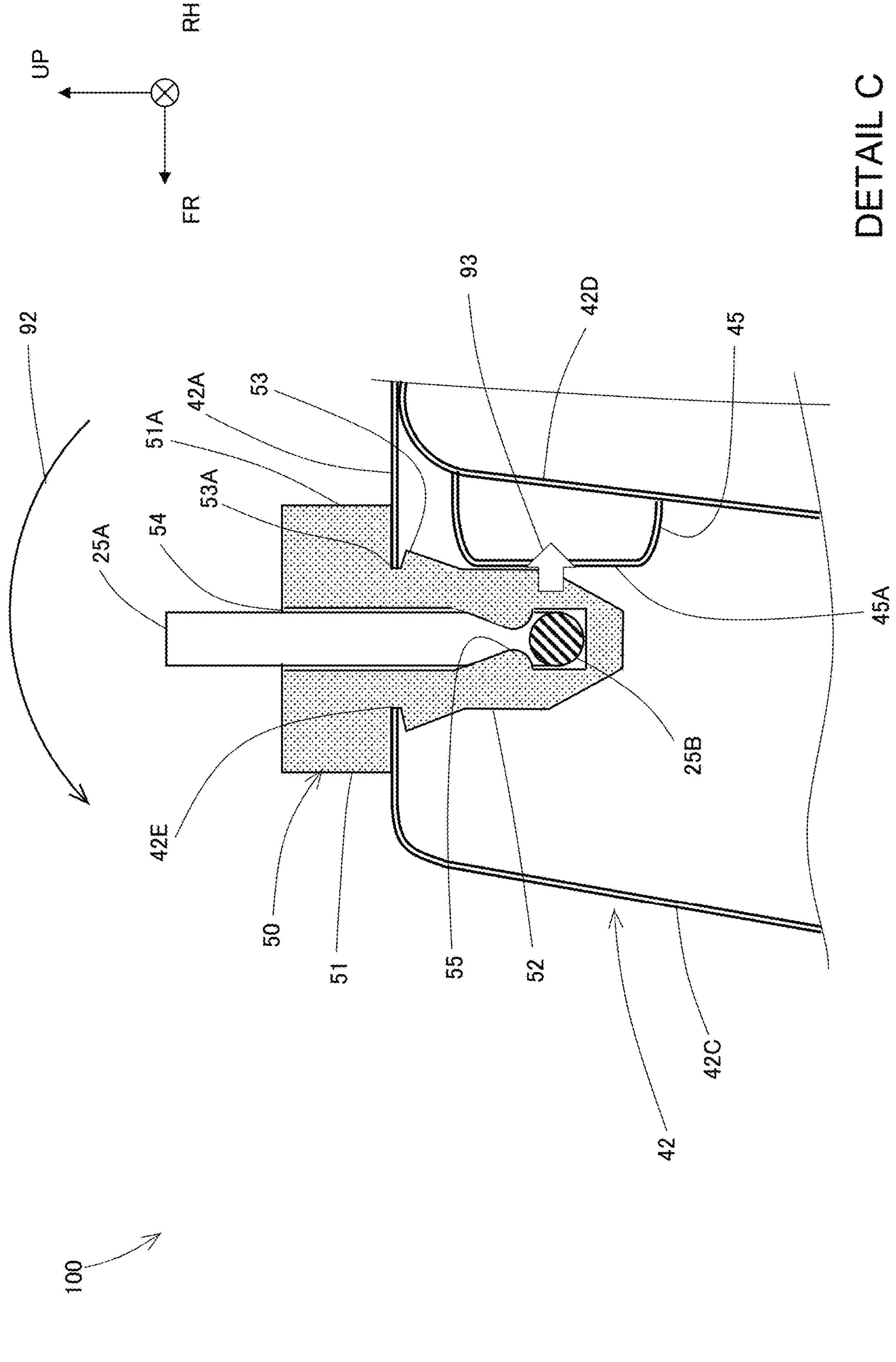
FIG. 5 is a detailed cross-sectional view of a portion C shown in FIG. 4.

As shown in FIG. 5, the clip 50 includes a head portion 51, a tip portion 52, an engaging claw 53, a wire hole 54, and a wire lock portion 55. The head portion 51 is a portion larger than the size of the hole 42E and is fixed to the upper plate 42A. The tip portion 52 is a portion extending downward from the head portion 51. The outer dimension of the tip portion 52 is slightly smaller than the inner dimension of the hole 42E, and is inserted into the closed cross-sectional portion 42 from the hole 42E. The tip portion 52 is inserted into the closed cross-sectional portion 42 from the hole 42E and extends toward the inside of the closed cross-sectional portion 42. The engaging claw 53 is a portion formed between the tip portion 52 and the head portion 51. The outer dimension of the engaging claw 53 is slightly larger than the inner dimension of the hole 42E. An engaging groove 53A is formed between the engaging claw 53 and the head portion 51. The engaging groove 53A engages with the peripheral edge of the hole 42E to fix the head portion 51 of the clip 50 to the closed cross-sectional portion 42.

A wire hole 54 into which the downward protruding portion 25 is inserted is provided in the head portion 51 and the tip portion 52. A wire lock portion 55 protruding from an inner surface of the wire hole 54 is provided at a lower portion of the wire hole 54. The wire lock portion 55 locks the lower end portion 25B of the downward protruding portion 25. When the downward protruding portion 25 is inserted into the wire hole 54 of the clip 50 and the lower end portion 25B is inserted beyond the wire lock portion 55, the lower end portion 25B is held by the clip 50.

A bracket 45 is attached to the rear plate 42D of the closed cross-sectional portion 42. A surface 45A of the bracket 45 on the vehicle front side is disposed on the vehicle rear side of the tip portion 52 in the closed cross-sectional portion 42, and extends along a side surface of the tip portion 52. As will be described later, the surface 45A constitutes an abutment surface with which the side surface of the tip portion 52 comes into contact when the vehicle 200 collides forward and the rear end 51A of the head portion 51 of the clip 50 is rotated so as to be lifted.

Next, the movement of the rear seat cushion 11 when the vehicle 200 including the vehicle rear structure 100 according to the embodiment collides forward will be described with reference to FIGS. 4 and 5. As indicated by an arrow 91 in FIG. 4, when the vehicle 200 collides forward, the rear seat cushion 11 attempts to move toward the front of the vehicle while rotating counterclockwise so that the rear portion thereof is lifted. Therefore, as indicated by an arrow 92 in FIG. 5, a rotation moment that attempts to rotate counterclockwise with respect to the rear floor panel 40 is applied to the clip 50. Due to this rotation moment, the rear end 51A of the head portion 51 of the clip 50 is lifted, and the tip portion 52 tends to rotate counterclockwise toward the vehicle rear side. However, as indicated by an outlined arrow 93 in FIG. 5, when the clip 50 rotates counterclockwise, the rear side surface of the tip portion 52 contacts the surface 45A. Thus, the rotational moment applied to the clip 50 is received by the rear plate 42D. Therefore, the clip 50 does not rotate with respect to the rear floor panel 40, and the rear end portion of the engaging claw 53 of the clip 50 can be prevented from coming off from the hole 42E. Therefore, it is possible to suppress the rear seat cushion 11 from being detached from the rear floor panel 40.

Next, the movement of the rear seat cushion 11 when the vehicle 210 including the vehicle rear structure 110 of the prior art that does not include the bracket 45 collides forward will be described with reference to FIG. 6. The vehicle rear structure 110 has the same structure as the vehicle rear structure 100 described above except that it does not include the bracket 45.

Figure 6:
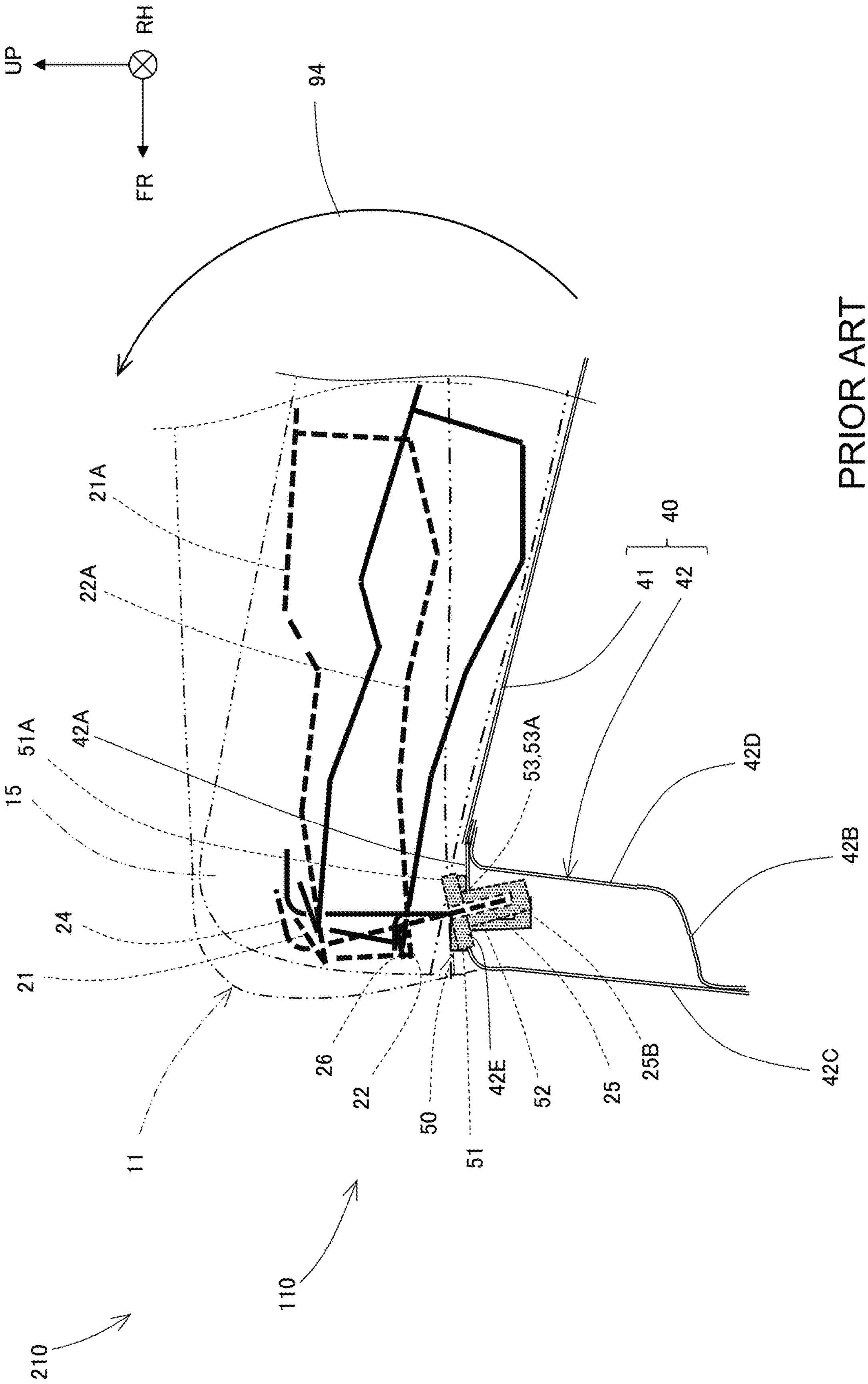
PRIOR ART FIG. 6
FIG. 6 is an explanatory view showing movement of a rear seat cushion when a vehicle having a vehicle rear portion structure according to the prior art collides forward.

When the vehicle 210 collides forward, as indicated by an arrow 94 in FIG. 6, the rear seat cushion 11 moves toward the front of the vehicle while rotating counterclockwise so that the rear portion thereof is lifted. At this time, a counterclockwise rotation moment is applied to the clip 50. A chain line in FIG. 6 indicates the rear seat cushion 11 when rotated. Therefore, the rear end portion of the engaging claw 53 of the clip 50 is disengaged from the hole 42E, and the clip 50 is disengaged from the rear floor panel 40. Then, the rear seat cushion 11 is detached from the rear floor panel 40 together with the clip 50.

On the other hand, in the vehicle rear structure 100 of the embodiment, as described with reference to FIGS. 4 and 5, since the rotation of the clip 50 is suppressed by the bracket 45 and the clip 50 is suppressed from coming off the rear floor panel 40, it is possible to suppress the rear seat cushion 11 from coming off the rear floor panel 40.

In the above description, the bracket 45 is provided on the rear plate 42D of the closed cross-sectional portion 42. However, other configurations may be employed. For example, the rear plate 42D may be provided with a protrusion protruding toward the front of the vehicle, and the side surface of the tip portion 52 may abut against the front surface of the protrusion. In this case, the front surface of the protrusion constitutes an abutment surface.

The invention claimed is:

1. A vehicle rear structure comprising:

a rear seat cushion;

a wire assembly disposed inside the rear seat cushion and having a downward protruding portion protruding downward from a lower surface of the rear seat cushion at a front portion of the rear seat cushion;

a clip attached to a rear floor panel to hold the downward protruding portion; and a closed cross-sectional portion of a rectangular cross section disposed at the front of the rear floor panel and extending in a vehicle width direction, wherein the rear seat cushion is attached to the rear floor panel by inserting the downward protruding portion into the clip, the clip has a head portion attached to an upper plate constituting a part of the closed cross-sectional portion and a tip portion extending into the closed cross-sectional portion, the closed cross-sectional portion includes an abutment surface with which a side surface of the tip portion of the clip contacts, and the abutment surface is disposed rearward to the clip.

2. The vehicle rear structure according to claim 1, wherein the abutment surface is a surface of a bracket attached to a rear plate constituting a part of the closed cross-sectional portion.

3. The vehicle rear structure according to claim 1, wherein the closed cross-sectional portion includes a rear plate provided with a protrusion protruding toward the front of the vehicle, the abutment surface is a front surface of the protrusion.

* * * * *